July 19, 1955  T. M. VAUGHAN  2,713,446
BOX-FILLING MACHINE
Filed Feb. 25, 1949  10 Sheets-Sheet 1

INVENTOR
Thomas M. Vaughan
by Hoopes, Leonard & Glenn
his attorneys

July 19, 1955 T. M. VAUGHAN 2,713,446
BOX-FILLING MACHINE
Filed Feb. 25, 1949 10 Sheets-Sheet 2

INVENTOR
Thomas M. Vaughan
by Hooper, Leonard & Glenn
his attorneys

July 19, 1955
T. M. VAUGHAN
2,713,446
BOX-FILLING MACHINE
Filed Feb. 25, 1949
10 Sheets-Sheet 3
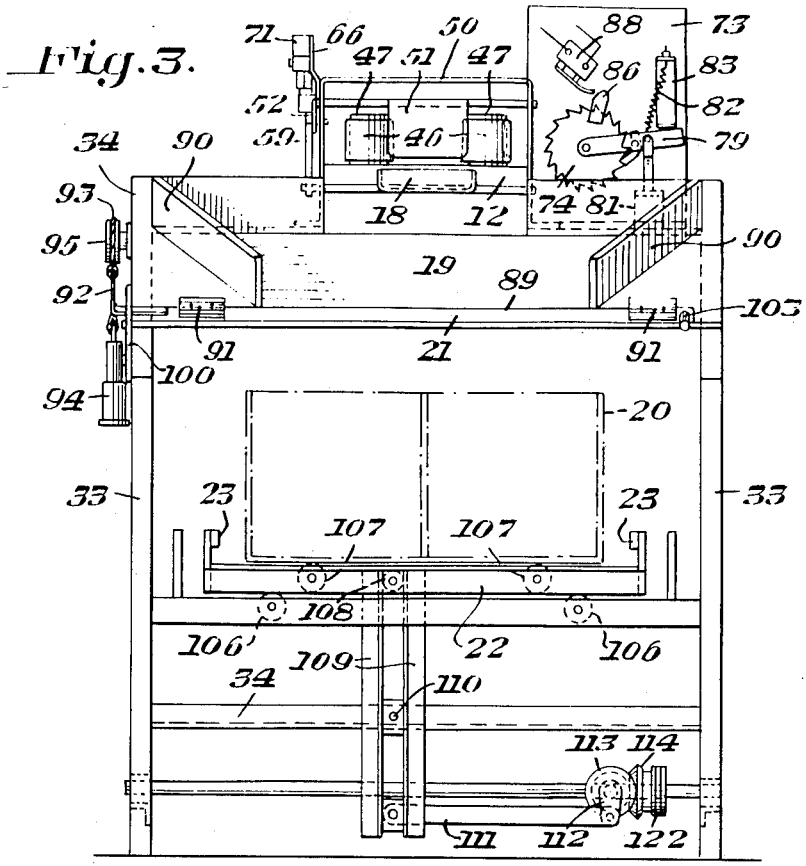
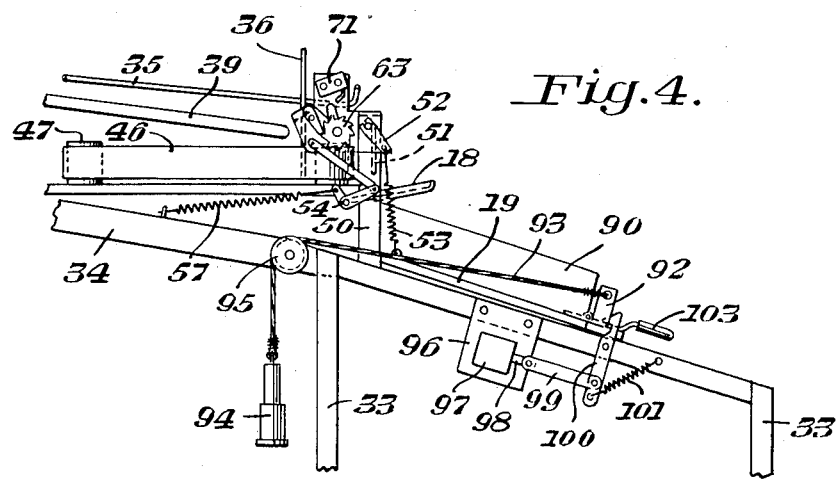
INVENTOR
Thomas M. Vaughan
by Hooper, Leonard & Glenn
his attorneys

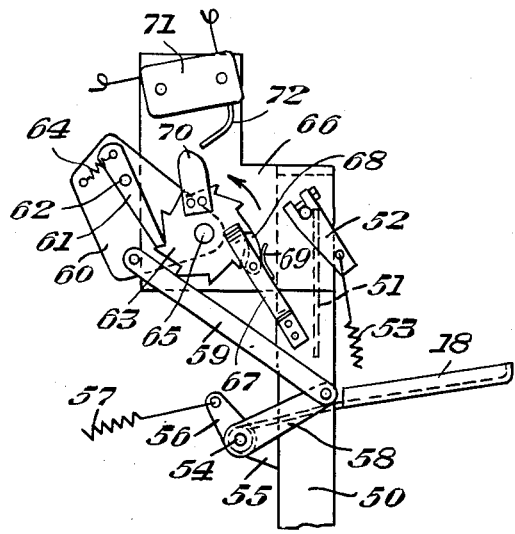

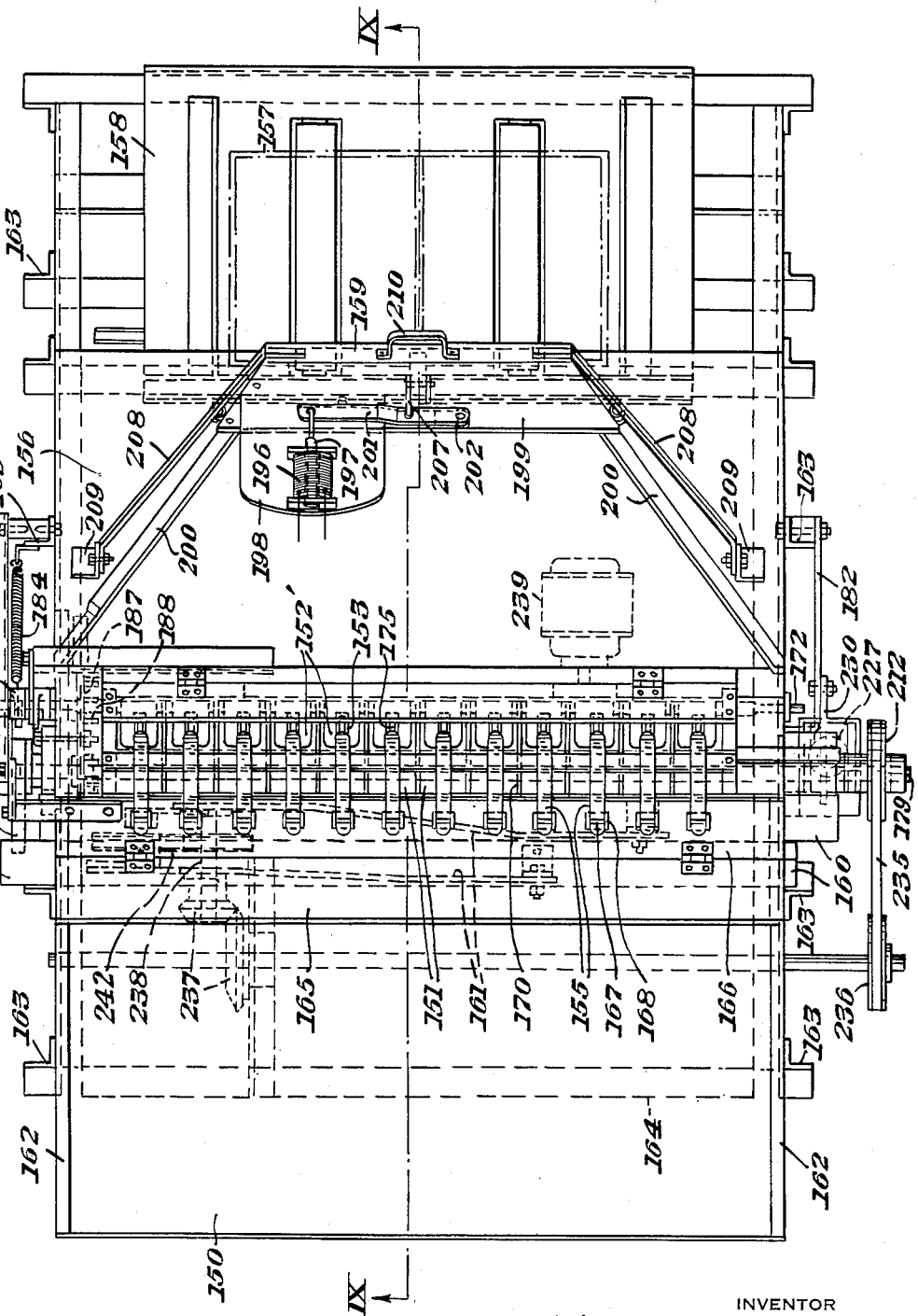

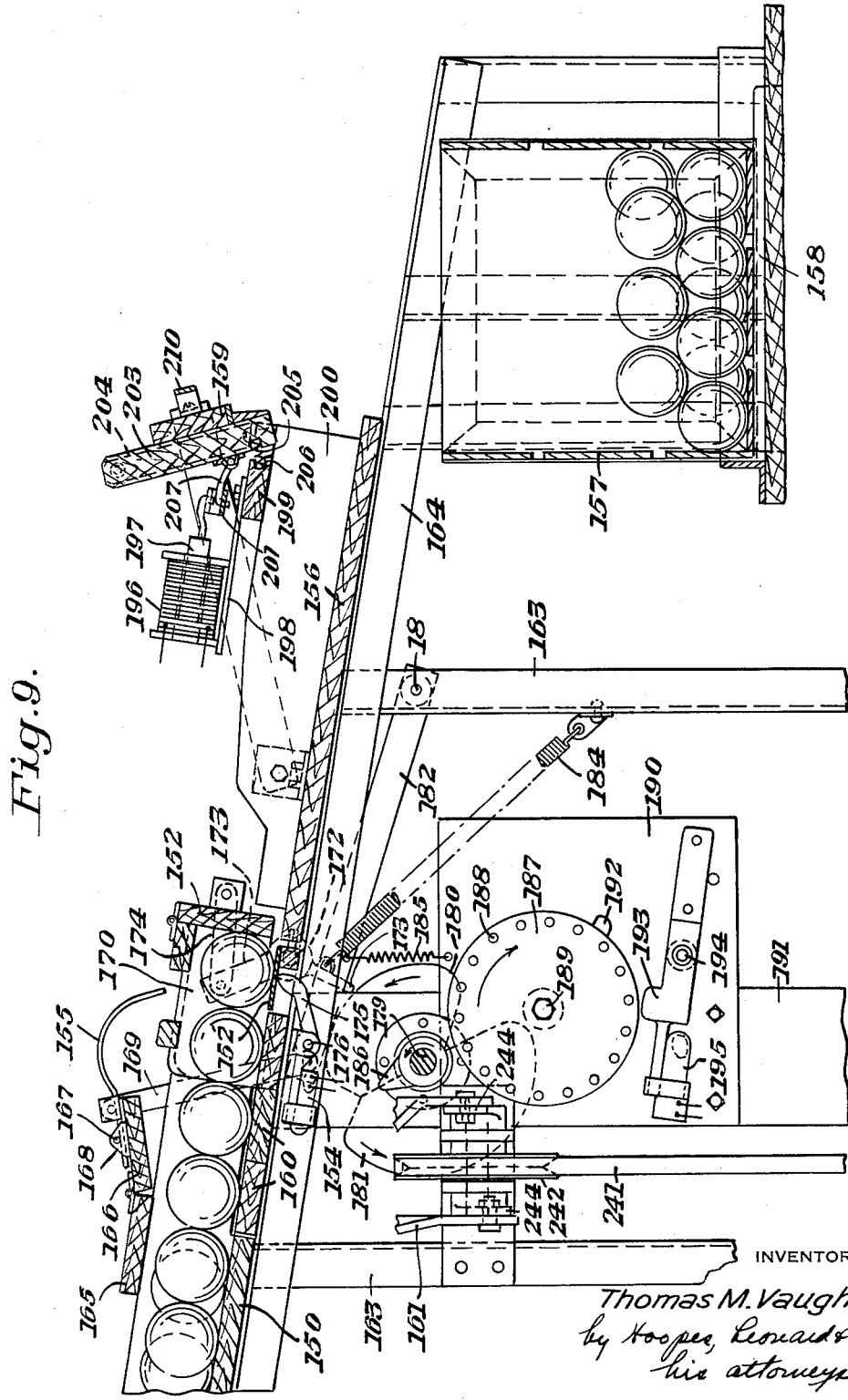

July 19, 1955  T. M. VAUGHAN  2,713,446
BOX-FILLING MACHINE
Filed Feb. 25, 1949  10 Sheets-Sheet 7
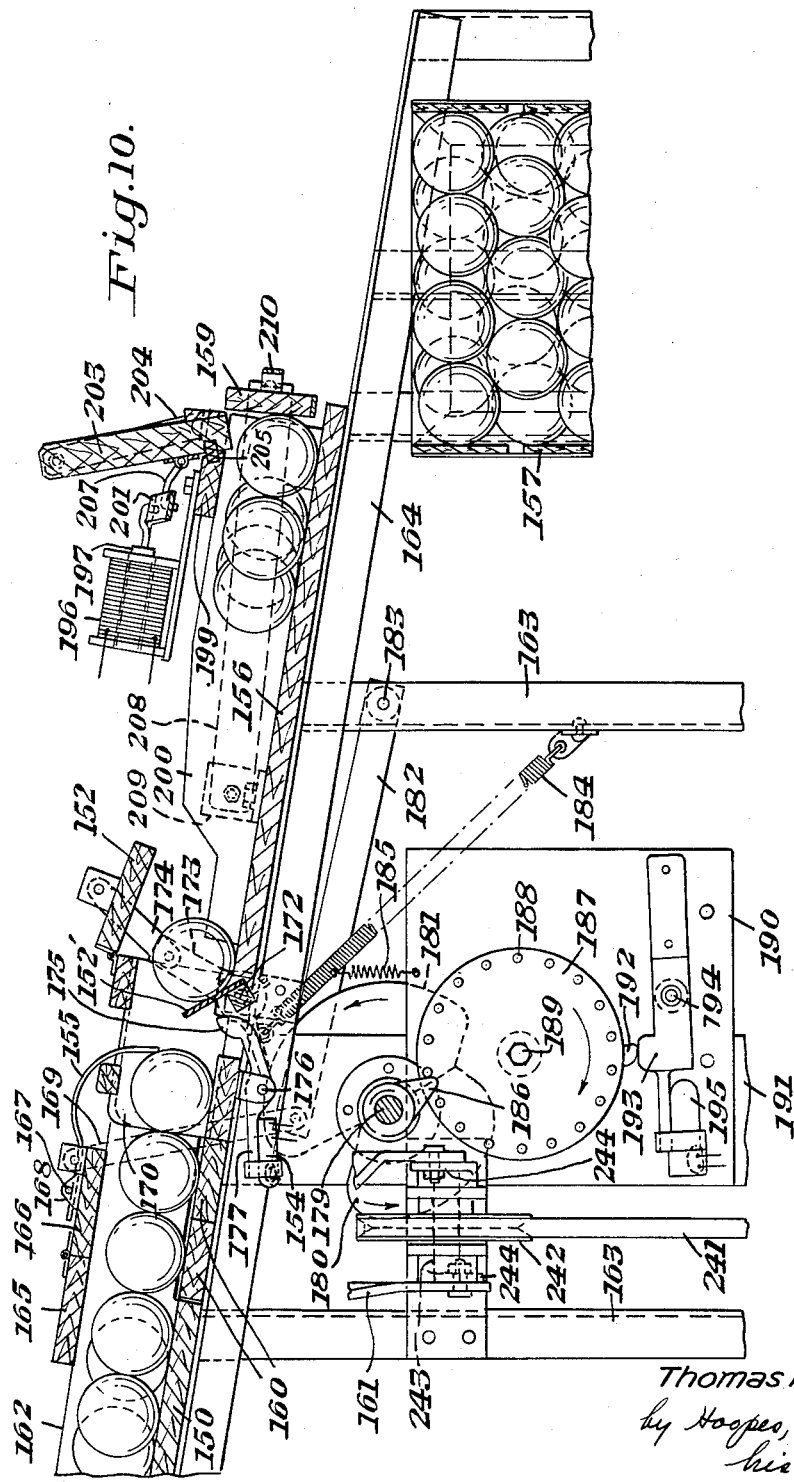
INVENTOR
Thomas M. Vaughan
by Hoopes, Leonard & Glenn
his attorneys

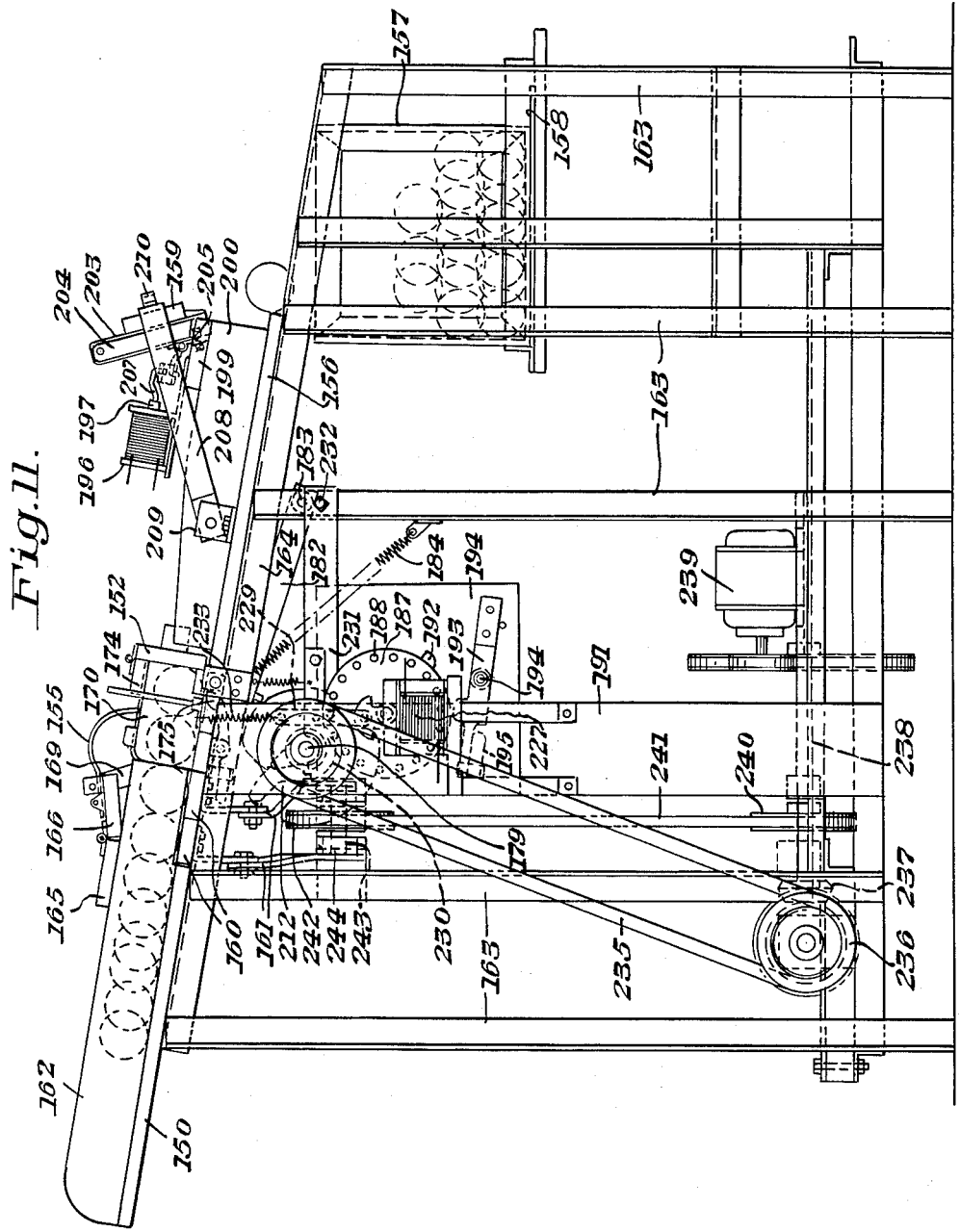

July 19, 1955

T. M. VAUGHAN 2,713,446

BOX-FILLING MACHINE

Filed Feb. 25, 1949

INVENTOR
Thomas M. Vaughan
by Hoopes, Leonard & Glenn
his attorneys

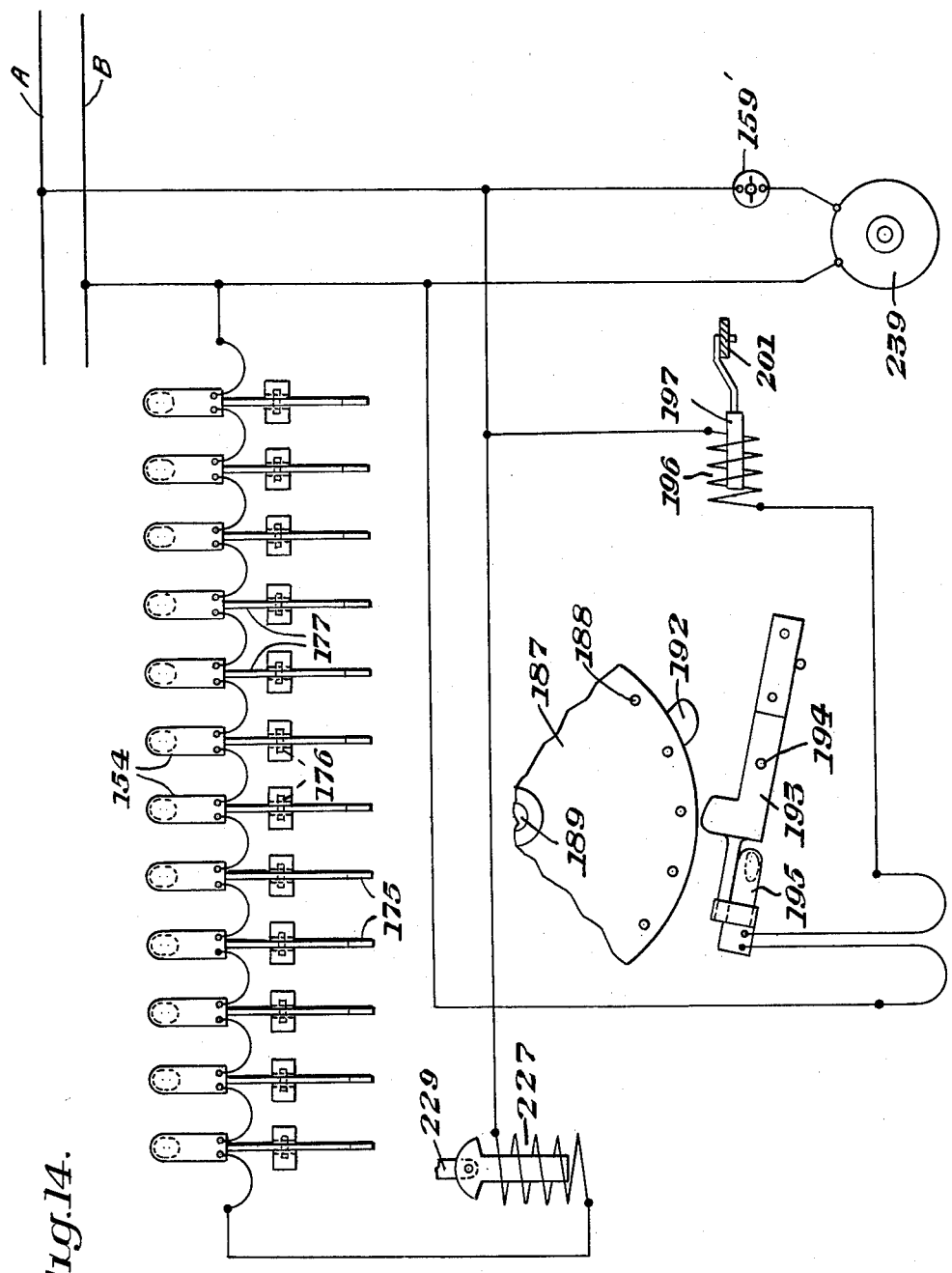

United States Patent Office 2,713,446
Patented July 19, 1955

2,713,446

BOX-FILLING MACHINE

Thomas M. Vaughan, Tampa, Fla., assignor to United Paper Company, Tampa, Fla., a corporation of Delaware Application February 25, 1949, Serial No. 78,254

20 Claims. (Cl. 226—2)

This invention relates to a machine for filling boxes with fruits, vegetables and other articles. More particularly, it is adapted to a machine for counting, filling and settling citrus fruit, such as oranges, in a standard citrus fruit crate or other container.

The counting and packing of citrus fruit has, for the most part, been a hand operation. Because such work is slow and laborious it has also been relatively costly. Moreover, the fruit when so hand packed is not always placed or settled in its most natural position among other pieces of fruit in the crate with the result that there is an increased tendency for the fruit to be bruised or unduly and unevenly pressed after the lid is placed on the crate.

It is the purpose of this invention to provide a machine which overcomes such difficulties. The machine of this invention automatically feeds and counts the fruit which is then deposited in the shipping container therefor and automatically and evenly settled among the other pieces of fruit therein.

Other objects and advantages of this invention will become apparent from the following description and from the drawings which are illustrative only, in which Figure 1 is a plan view of a preferred embodiment of this invention;

Figure 3 is an end view of the front of the machine shown in Figure 1;

Figure 4 is a side view of a portion of the machine looking at the side opposite to the side shown in Figure 2;

Figure 5 is a detailed view of a portion of the counting mechanism shown in Figure 4;

Figure 6 is a detailed view of another portion of the counting mechanism shown in Figure 3;

Figure 7 is a schematic diagram of the electrical circuit of the machine shown in Figure 1;

Figure 8 is a plan view of an alternative embodiment of the feeding and counting mechanism of this invention;

Figure 9 is a vertical view in cross section taken along line IX—IX of Figure 8;

Figure 10 is a vertical view in cross section of a portion of the machine taken along line IX—IX of Figure 8 with the mechanism in a different operating phase;

Figure 11 is a side view of the machine shown in Figure 8 taken along line XI—XI of Figure 8;

Figure 14 is a schematic diagram of the electrical circuit of the feeding and counting mechanism shown in Figure 8.

*General construction and operation*

Figure 1:
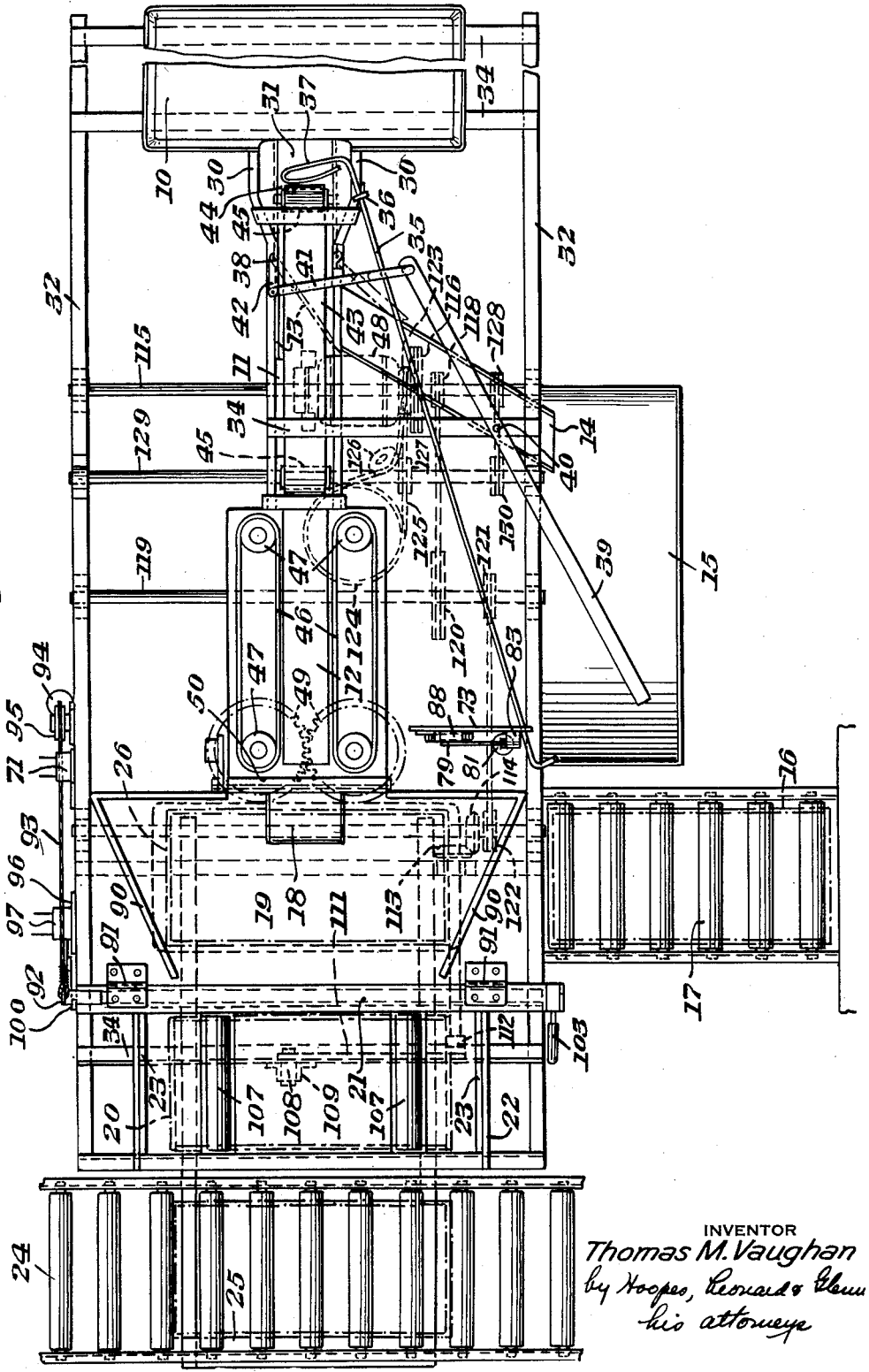
Figure 2:
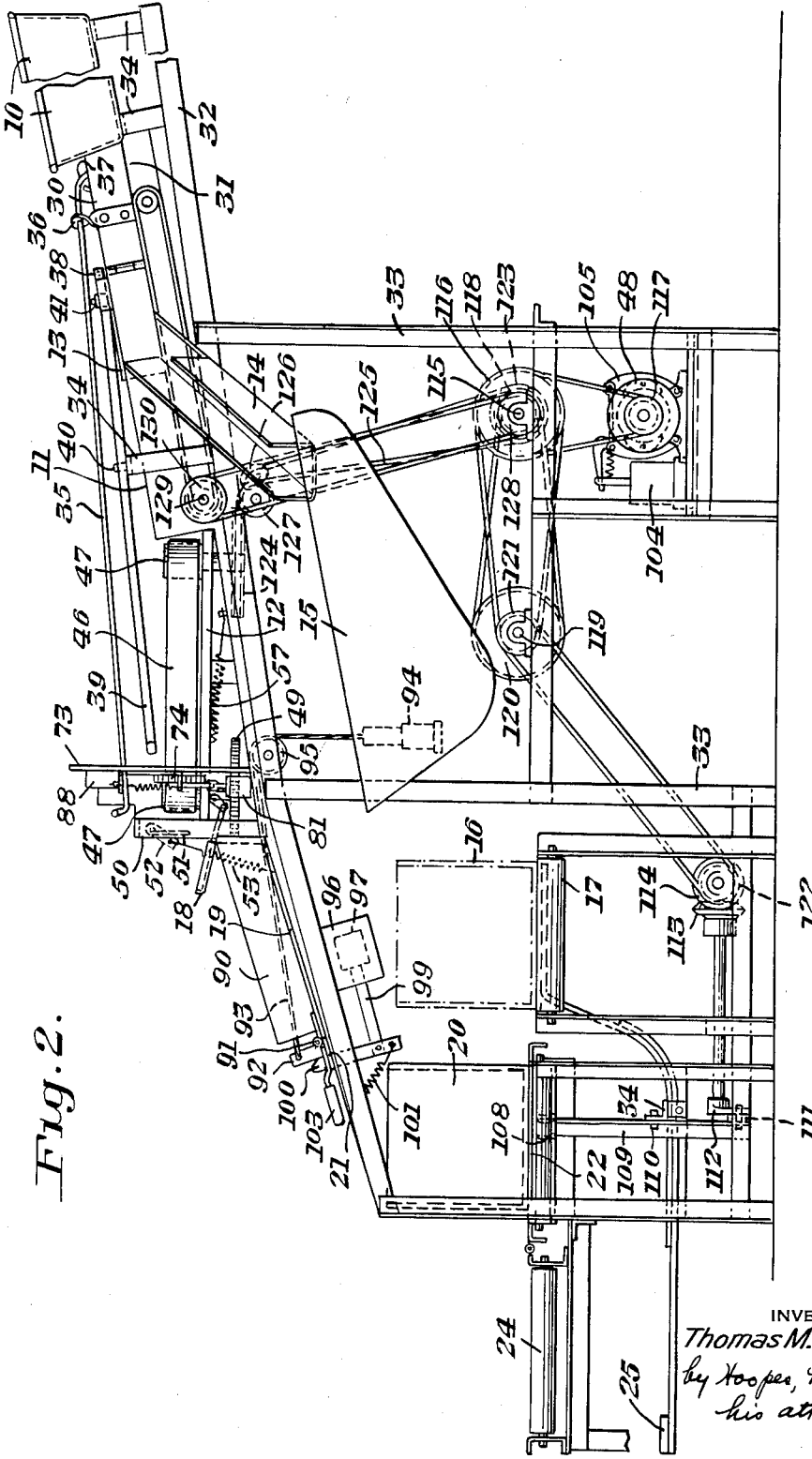
Figure 2 is a side view of the machine shown in Figure 1.

Citrus fruit such as oranges are usually packed in a standard size box or crate having given dimensions. As a consequence, oranges are sized according to the number which are capable of being packed in such a box. One such size is known as 216 for that reason and there are a number of others. In the filling of orange crates, only a particular size of orange, and the same is true of other fruits and vegetables, is used at a given time, whether the packing or filling is done by hand or by machine.

In the preferred embodiment of this invention shown in Figures 1 to 7, a supply of a given size of orange is placed in a bin 10 from whence the fruit is fed singly through a chute 11 and onto a feeding platform 12. Positioned along the side of chute 11 there is a diverting gate 13 which can be operated to pass fruit through a movable portion 13' on the opposite side of chute 14 into a bin 15 at the side of the machine. The reason for diverting fruit to bin 15 is that an attendant is thus able to hand wrap individual pieces of fruit taken from bin 15 for the purpose of packing it as the bottom layer in a box 16 (shown in chainline outline). Similarly, a box entirely filled with the correct number of oranges except for the top layer can be positioned at roller conveyor station 17 in order that the attendant may hand wrap fruit from bin 15 and complete the packing of that top layer for display purposes. In the 216 size of orange, 36 pieces of fruit will form a bottom or top layer in a standard partitioned crate, each section of which is 12"x12"x12" in dimension. The number of pieces of fruit not so wrapped which complete the filling of the box 16 would thereby total 180.

With respect to fruit reaching the feeding platform 12, each piece falls on trip 18 and drops on an inclined table 19 whence it runs into a box 20 when a gate 21 is open. When the predetermined number of pieces of fruit have fallen against trip 18, gate 21 closes, cutting off any further flow of fruit into box 20 until an attendant restarts the box-filling cycle. In the particular embodiment shown in Figures 1 to 7, the mechanism is designed for the 216 size of orange but is adjustable for other sizes and is also adjustable to change the number of pieces which will be counted into box 20 before gate 21 is closed in the event no hand wrapped packing from bin 15 is performed.

As the fruit runs into box 20 from table 19, a settling platform 22 jars the fruit by a side-to-side rocking against abutments 23. This rocking settles the fruit in box 20 evenly, uniformly and naturally relative the other pieces of fruit therein.

As the filling of each box 20 is completed, it is pulled forward by an attendant onto a roller conveyor 24 and shoved out of the way whence it goes either to the lidding machine or is moved onto roller conveyor station 17 or a comparable station for hand packing of the uppermost layer. The same attendant meanwhile steps on a treadle 25 slightly raising a readiness platform 25' and a previously positioned empty box 26 whence it may easily be pulled forward into position on settling platform 22.

In many circumstances it is desirable to have a battery of machines such as the embodiment shown in Figure 1 standing side by side and having a common roller conveyor, such as roller conveyor 24, passing in front of each. Moreover, it may also be desirable to provide an embodiment of the machine of this invention having a fruit feeding and counting mechanism in which more than a single piece of fruit is fed and counted at a given instant.

An embodiment of this invention employing multiple gate feeding and counting mechanism is illustrated in Figures 8 to 16, inclusive. In this embodiment, a supply of uniformly sized fruit is dumped on an inclined table 150 whence it runs into a series of parallel stalls 151 coming to rest against a gate 152. Each piece of fruit abutting against gate 152 depresses its respective switch lever 153 to which is connected a mercury switch 154. Since these switches are connected in series, it follows that when each of the compartments or stalls 151 is occupied, the circuit of the machine is energized, opening gate 152 and dropping the barrier fingers 155. This allows only the fruit abutting gate 152 to run out on the inclined tray 156 whence the fruit falls into a box 157 supported on a table or platform 158 which can be a settling platform of the type earlier mentioned.

When the compartments 151 have operated eighteen times, in a case where a size 216 orange is used, without any hand packed layer, 216 oranges will have passed onto rundown apron or tray 156 and into box 157. At that point gate 159 drops, catching subsequent discharges of oranges by the raising of gate 152 and the tilting of plates 152' in the compartments 151. Meanwhile, the attendant removes the filled box 157 and places an empty one under the edge of tray 156 before manually raising gate 159 into its open latched position to start another filling operation. The gate again falls in the interval after the 216th orange, in the case we have cited, runs into the box and before the next succession of twelve oranges reaches that point. Unlike the preferred embodiment, the cycle which feeds oranges onto tray 156 is not stopped when gate 159 closes, since the interval required to count out the number necessary to fill the box is long enough and the capacity of tray 156 is extensive enough to permit such continuance. Provision may readily be made to stop the machine when closure gate 159 falls, as by means of a manual switch 159'.

Fruit-feeding mechanism

In the preferred embodiment, the fruit-feeding mechanism comprises the pan 10, the chute 11, the feeding platform 12 and the attendant drives and connected equipment. Oranges in pan 10 tend by gravity to roll out of an opening in the lower side thereof into chute 11 which is roughly of trough shape, having sides 30 and a bottom portion 31 supported on a frame extension 32 which also supports pan 10. In general, the frame consists of vertical supporting members 33 and connecting horizontal and inclined frame members 34 of substantially cubical outline with a downward inclination toward the delivery end of the machine. A hooked bar 35 is rotatably mounted in brackets 36 in such fashion that its looped end 37 forms a gate immediately in front of the opening in pan 10 through which oranges roll. Rotating hooked rod 35 to remove gate 37 rotatably from in front of said opening permits oranges to pass out into chute 11. Otherwise, gate 37 holds the oranges in pan 10.

Part way down side 30 on the side away from bin 15 there is the gate 13 hinged at 38 and operated by a handle 39. Handle 39 is pivoted at 40 to a frame member 34 and through the links 41 and 42 swings gate 13 into the dotted position shown in Figure 1 athwart the passage through chute 11 when oranges are to be diverted into chute 14 and bin 15. Normally, handle 39 is pulled away from the side of the machine so that gate 13 lies flat against side 30. Under such circumstances, oranges pass through chute 11 assisted by the feeding movement of the endless belt 43, the upper surface of which projects slightly above the bottom 31 of chute 11 through an aperture 44 therein. Endless belt 43 passes over rolls 45 journaled in the cross brackets supporting chute 11.

Upon leaving chute 11 each piece of fruit passes onto the feeding platform 12 whence its positive forward feeding movement is continued between the opposed endless belts 46, the spacing between the adjacent sides of which is such as to lightly touch the fruit passing through. These endless belts 46 reciprocate about the vertical axes of rollers 47. Since one of the belts is directly connected to the prime mover 48 through suitable belting and gearing, the other endless belt 46 is driven in synchronism therewith by means of the meshing pair of matched spur gears 49. At the delivery end of feeding platform 12 there is a rectangular arch 50 directly supported on the frame of the machine spanning the passage between belts 46. Journaled in the sides of arch 50 there is an overhanging flap 51 which is pivotally connected to a lever 52. Lever 52 in turn is maintained so as to keep flap 51 in a pendant position under the influence of a spring 53 connected at its lower end to the machine frame. Flap 51 causes each piece of fruit leaving feeding platform 12 to drop rather precipitately on trip 18 without being carried over trip 18 by the momentum acquired in the course of the feeding operation.

The single gate counting mechanism

As each orange falls on trip 18, it is depressed turning shaft 54 journaled in bracket 55 attached to arch 50. As shaft 54 turns in a clockwise direction under each impact, as seen in Figure 5, an extension arm 56 stretches spring 57 which is connected at its other end to a frame member 34 to normally maintain trip 18 in its upper position. Rotation of shaft 54 also rotates crank arm 58 connected to link 59 and pawl plate 60. A pawl 61 pivoted to pawl plate 60 at 62 moves a ratchet gear 63 in a counterclockwise step-by-step fashion, as shown in Figure 5. Pawl 61 is maintained in engagement with gear 63 by spring 64. Both pawl plate 60 and ratchet gear 63 are pivotally supported on a stud bearing 65 journaled in a plate 66 fastened to and extending rearwardly from the side of arch 50. A bracket arm 67 carries a detent 68 pivotally connected thereto and which under the effect of spring 69 prevents any reversing movement of gear 63 as pawl plate 60 is rocked in a clockwise direction in the course of the counting operation.

An ear 70 is affixed to ratchet gear 63 adjacent the center thereof and is bent outwardly and then parallel to the side of the gear to clear bracket arm 69 in its sweep. Affixed to the upper end of plate 66 there is a switch 71 having a depending switch lever 72 which is normally in the path of the outer end of ear 70. Hence, inasmuch as ratchet gear 63 has nine teeth thereon there will be a complete revolution thereof for each nine oranges which fall on trip 18. For each complete revolution of gear 63, switch 71 will be momentarily energized when lever 72 is moved by ear 70.

A plate 73 is supported by the frame of the machine to one side of feeding platform 12. This plate carries a second ratchet gear 74 rotatably mounted thereon on a stud shaft 75. Axial movement of gear 74 is prevented by a guard arm 76 which also has pivotally mounted thereon a detent 77 held in locking position by a spring 78. A rocking arm 79 pivoted about shaft 75 is linked to a core 80 operated by a solenoid 81. This core 80 is maintained in withdrawn position by spring 82 fastened at its other end to a bracket 83 attached to plate 73. Rocking arm 79 carries a pawl 84 pivoted thereto and maintained in engagement with the teeth of ratchet gear 75 by a leaf spring 85.

An ear 86 is riveted to the side of gear 74 opposite to that adjacent which rocking arm 79 operates. Since ratchet gear 74 has twenty teeth, for each twenty energizations of solenoid 81, gear 74 will make one complete revolution. For each complete revolution of gear 74 the outer end of ear 86 will engage a switch lever 87 to make contact in a switch 88 affixed to plate 73.

Solenoid 81 is energized once for each complete revolution of ratchet gear 63. Hence, switch 88 is energized once for every 180 oranges successively hitting trip 18. This number of oranges corresponds to a filled box using oranges of 216 size in which the top or bottom layer of 36 oranges is hand packed as mentioned earlier. It is evident that by substituting gears corresponding to gears 63 and 74 having the proper number of teeth on each, the machine can readily be adapted for use in filling boxes with other sizes of fruit.

Immediately after each orange hits trip 18 it falls on inclined tray 19 and is directed toward the edge 89 thereof by the converging arms 90. The opening between the ends of the arms 90 is set so that all oranges falling over edge 89 will drop into box 20 positioned on settling platform 22. A gate 21 is hinged by hinges 91 adjacent edge 89 and when open forms a short extension for tray 19. To one end of gate 21 an upstanding arm 92 is affixed and connected by a flexible line 93 to a counterweight 94. Line 93 passes over a sheave 95 rotatably supported on a frame member 34 at the side of the machine.

Figure 7 illustrates in a schematic fashion the electrical circuit used in connection with the preferred embodiment of this invention. A voltage drop is continually maintained between the power lines A and B. Each time ear 70 closes switch 71, solenoid 81 is energized to advance ratchet gear 74 a single step. Each time ear 86 closes switch 88 solenoid 97 is energized to unlatch latch 100, permitting gate 21 to close the open lower end of tray 19. The energization of the circuit containing solenoid 97 also opens a switch C to stop the prime mover 48 and any further feeding of pieces between belts 46. At the same time, a solenoid 104 is energized to apply the conventional magnetic brake 105 shown in Figure 2. To recommence the box-filling cycle, the operator pulls handle 103 until gate 21 is latched in open position by latch 100. Under some circumstances, it will be advantageous to make tray 19 of such size and capacity that it will hold sufficient oranges during the removal of a filled box 20 and replacement therewith by an empty box 26 to permit the feeding and counting to continue even though gate 21 has been released to snap into closed position.

*Settling and driving mechanism*

Settling platform 22 is mounted for lateral oscillation on rollers 106 journaled in certain frame members 34 as illustrated best in Figures 1 and 4. This platform 22 supports a box 20 thereon on rollers 107 journaled between the sides of platform 22 intermediate the ends carrying the abutment stops 23. Also journaled on the underside of platform 22 is a follower roller 108 which is held in engagement between the parallel sides of a compound rocking lever 109. This rocking lever is pivoted at 110 to a lateral frame member 34 and at its lowermost end is pivotally connected to a pitman 111. The other end of pitman 111 is pivotally connected to a crank 112 operated by a bevel gear 113 in mesh with a driving bevel gear 114. Hence, as crank 112 rotates, pitman 111 reciprocates and settling platform 22 is rocked from side to side on rollers 106. In turn, as fruit falls into a box 20 positioned on platform 22, it is rocked back and forth from side to side hitting abutment plates 23 to settle the fruit in a natural and even manner in the box.

As prime mover 48, in this instance an electrical motor, rotates, a shaft 115 laterally extending across the machine and journaled in pillow blocks thereon is rotated through the medium of pulley 116 turned by driving pulley 117. In turn, pulley 118 keyed to shaft 115 turns shaft 119 by means of pulley 120 and thence through pulleys 121 and 122 rotates driving bevel gear 114. At the same time, a pulley 123 on shaft 115 rotates driven pulley 124 by means of a belt 125 passing over guide sheaves 126 and 127. It is the rotation of pulley 124 which moves the endless belts 46 through the interposition of latched spur gears 49 since belt 46 which is turned by the roller positioned above pulley 124 in turn rotates the driving one of the two gears 49. Also on shaft 115 there is a pulley 128 which turns a shaft 129 by means of pulley 130 thereby causing the feeding rotation of endless belt 43 by means of the lower of the rollers 45.

As is well understood, the relative proportions of the respective pulleys is so chosen and the positioning of the ears 70 and 86 on the respective ratchet gears 63 and 74 is so made that appropriate speeds for the feeding mechanism is obtained in conjunction with proper synchronization for the operation of the various parts connected to the electrical circuit shown in Figure 7.

*Feeding and counting mechanism of alternative embodiment*

In the alternate embodiment oranges are dumped on the inclined table 150 and crowd toward the lower end at the entrance to the compartments or stalls 151. Adjacent the entrance of compartments 151 and forming a portion of the floor of table 150 are two agitating strips 160 which are reciprocated laterally out of phase with each other by their respective pitmans 161. Sides 162 on the table guard against any oranges falling off the side of the machine. The frame of the machine comprises a series of vertical structural members 163 and horizontal frame members 164. A beam 165 spans the table 150 adjacent the respective entrances to compartments 151 and is supported by sides 162 as shown in Figure 8. Hinged to beam 165 is a second strip 166 carrying the separator fingers 155 in locked frictional engagement under a pin 167 journaled between the upstanding sides of a bracket 168 fastened to strip 166 so that one such finger 155 is positioned along the median axis of each compartment 151. One end of strip 166 is pivotally connected to link 169 which is reciprocated in such fashion as to cause fingers 155 to hold and to release oranges in the entrance ends of compartments 151 as illustrated in Figures 9 and 10.

Each compartment 151 is separated from the immediately adjacent compartment by a partition 170. The floor at the forward or delivery end of each compartment 151 comprises a metal plate 152' having an aperture 171 in the center thereof. Each of these plates 152' is in the same plane with each other plate and each is keyed to a rotatable shaft 172 for partial rotation to eject oranges in the forepart of the compartments while fingers 155 hold the succeeding row of oranges and while gate 152 is open. The partial rotation of shaft 172 is obtained through the medium of a bell crank lever 173 keyed thereto and linked to gate 152 by a link 174. The same movement which tilts plates 152' forwardly thus also opens gate 152 in such manner that the ejection of the front row of oranges by plates 152' is not impeded.

A tongue 175 projects through each aperture 171 when plates 152' are flush with the floor of tray 19. These tongues are pivoted at 176 on the underside of that floor and have a rearward extension 177 carrying a mercury switch 154. As an orange rolls into each compartment 151, the tongue 175 in that compartment is depressed, tilting the corresponding mercury switch 178 and establishing conductive contact between the terminals therein. When each of the compartments 151 is occupied by an orange abutting against gate 152, all of the tongues 175 are depressed, and the circuit through the mercury switches, which are connected to each other in series, is completed, as schematically shown in Figure 14.

Completion of this circuit causes a shaft 179 to make a single complete revolution. As shaft 179 revolves, cam plates 180 and 181, which are rigidly fastened to shaft 179 and are spaced side by side of each other along that shaft, are correspondingly rotated. As cam plate 181 revolves, it strikes the lower end of bell crank lever 173 and, as shown in Figure 10, opens gate 152. At the same time, it rotates shaft 172 through an arc as shown in Figure 10, causing plates 152' to eject the row of oranges which had been depressing the tongues 175. Meanwhile, cam plate 180 which had been at rest in a position holding a lever 182 pivoted to the frame of the machine at 183 in its elevated position, thereby through link 169 maintaining fingers 155 out of the path of the oranges moving into compartments 151. A spring 184 and a spring 185 respectively cause levers 173 and 182 to closely follow their respective cam plates 181 and 180. Hence, upon commencement of rotation of shaft 179, cam plate 180 first lowers fingers 155 and then cam plate 181 engages lever 173 to raise gate 152 and eject the front row of oranges. Completion of the single revolution of shaft 179 restores plates 152' to their flush position, closes gate 152 and then raises fingers 155.

Shaft 179 also carries keyed thereto a dog 186 which in the course of a single revolution advances a wheel 187 having laterally extending pins 188 therein for successive engagement by dog 186. Wheel 187 is rotatably mounted at 189 to a plate 190 supported on a second plate 191 connected to lower and upper frame members 164. In the course of eighteen single revolutions of shaft 179, wheel 187 makes one complete revolution. In the course of each complete revolution of wheel 187 an ear 192 attached to the outer periphery thereof engages switch lever 193 once, depressing it about a center 194 and completing the circuit through a mercury switch 195 carried by lever 193. A solenoid 196 is in the circuit with switch 195 and upon energization pulls core 197 into the window of the solenoid. Solenoid 197 is mounted on a plate 198 connected to a beam 199 spanning and connected to the forward end of converging arms 200 on tray 156. Thus, when core 197 is retracted, it pulls lever 201 about a pivotal connection 202 at the other end of the lever, said connection being made with beam 199.

A latch 203 is swingably mounted between two substantially upright brackets 204 supported on beam 199. A spring 205 urges latch 203 into latching position in the recess 206 in beam 199 provided for the lower end of latch 203. A hook 207 extends from the rear of latch 203 and engages a corresponding hole in the body of lever 201 intermediate the ends thereof as shown in Figures 8 to 10. Hence, when solenoid 196 is energized, latch 203 is pulled inwardly and releases gate 159 so that it falls from the open position shown in Figure 9 into the closed position shown in Figure 10. A pair of arms 208 are hinged to brackets 209 on tray 156 outside arms 200. The forward ends of arms 208 are bolted to gate 159 which is also provided on the outside thereof with a handle 210.

Since there are twelve compartments 151 and eighteen pins 188 on wheel 187, gate 159 will drop into closed position immediately upon the passage of 216 oranges over tray 156 and into the box 157 being filled, it will thus be recognized that this setting of the embodiment shown in Figures 8 to 14 is intended for use with oranges of the 216 size in which no layer of oranges is hand packed. If one layer is to be hand packed, 180 oranges will be fed and counted by the alternative embodiment by providing a suitable substitute wheel for wheel 187 having fifteen pins corresponding to pins 188. In the same manner, other sizes of oranges can be automatically fed and counted.

Figure 12:
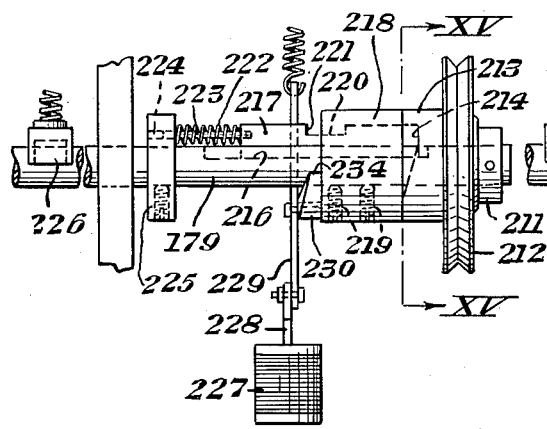
Figure 12 is a detailed view of the clutch mechanism shown in Figure 11, in engaged position.
Figure 13:
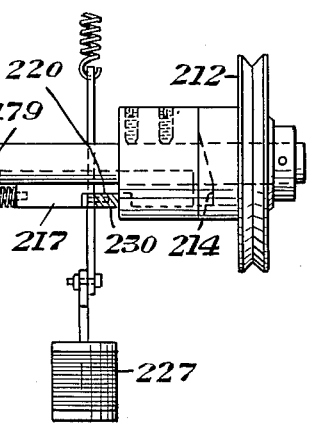
Figure 13 is a detailed view of the clutch mechanism shown in Figure 11, in disengaged position.
Figure 15:
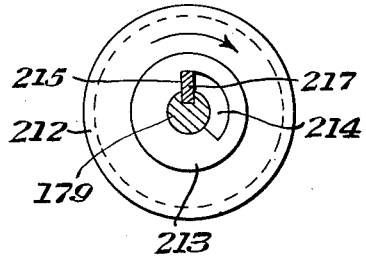
Figures 15 and 16 are views taken on line XV—XV with the spline respectively engaged and disengaged from the coacting hub.
Figure 16:
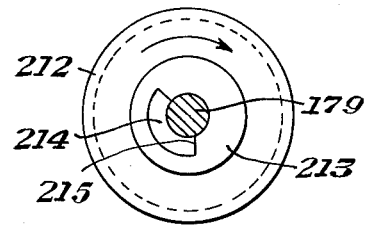

The details of the clutch for insuring a single revolution of shaft 179 each time a row of oranges fills the forepart of compartments 151 is illustrated in Figures 11 to 13. At the outer end of shaft 179 there is a collar 211. Next thereto is a pulley 212 having an integral hub 213, both of which rotate freely on shaft 179. The interior face of hub 213 is recessed at 214 in arcuate fashion immediately adjacent and parallel to the outer periphery of shaft 179. This recess increases gradually in depth viewed in a direction opposite to the direction of motion of the hub when looking into the recess from the near side, ending at a shoulder 215, extending substantially radially of the axis of shaft 179. A splineway 216 is milled in shaft 179 and extends under hub 213 a distance slightly greater than the depth of shoulder 215 measured horizontally from the vertical face of hub 213. A spline 217 slides in splineway 216 and is kept therein by a collar 218 recessed to accommodate axial passage of spline 217. In addition, a collar 218 prevents any substantial inward longitudinal movement of pulley 212 and hub 213. Collar 218 is rigidly fastened to shaft 179 by set screws 219. Intermediate the ends of spline 217 there is a notched portion 220 having vertical ends, the inner end being 221. Spline 217 is urged into outward longitudinal movement by a spring 222 threaded on a spring rod 223 which is free to move longitudinally through a drilled hole 224 in a collar 225 also rigidly fastened to shaft 179. A spring-loaded brake 226, faced with a suitable friction material, bears on a portion of the periphery of shaft 179 and prevents free running of shaft 179 after positive connection is broken between the driving means, pulley 212, and the spline 217.

A solenoid 227 is connected in the series circuit with the switches 178. Hence, when all of tongues 175 are depressed, solenoid 227 is energized drawing core 228 into the interior of solenoid 227. This movement pulls on link 229 pivotally connected to the rearward extension of a clutch 230. This rearward extension is bolted to a rocking arm 231 pivoted at 232 to a frame member 163. This clutch is urged upward under the pull of a spring 233 connecting the upper end of link 229 and a bracket on the frame of the machine.

The outer end of clutch 230 comprises a member which is substantially semicircular in elevation and tapered or wedge shaped in plan with the narrower portion being at the outer tip of the clutch. When shaft 179 is at rest, spline 217 points vertically downward. The lowermost portion of clutch 230, which is substantially semicircular in elevation, rests against the bottom of notch 220 between inner end 221 and the inner side of collar 218. The thickness measured along the axis of clutch 230 at this point is sufficient to hold spline 217 out of engagement with shoulder 215 of hub 213. When solenoid 227 is energized, clutch 230 is depressed, permitting spline 217 to be urged outwardly against the face of hub 213 until, owing to the constant rotation of pulley 212, the outer end of spline 217 above the splineway 216 comes to rest against shoulder 215 and movement to shaft 179 is thereby imparted, spline 217 sweeping at least through the first quarter-revolution before solenoid 227 is deenergized. As shaft 179 goes through its single complete revolution it actuates the various elements in the manner previously described. As spline 217 and the shaft complete about three-quarters of a single revolution, the upper, outer, narrower tip 234 of clutch 230 enters notch 220 in the space remaining between end 221 and the inner face of collar 218 causing the withdrawal of spline 217 from recess 214 because of the increase in the taper of the clutch inwardly from tip 234. This disengagement occurs just as spline 217 returns to its lowermost position. Shaft 179 thereupon stops under the effect of brake 226.

Pulley 212 receives its movement through belt 235 driving pulley 236 and a meshing pair of bevel gears 237 on a shaft 238 turned by an electrical motor 239. A pulley 240 is keyed to shaft 238 and through an endless belt 241 drives a pulley 242 mounted on a stud shaft 243 journaled in brackets on the rear of plate 190. The outer ends of the stud shaft carry cranks 244 spaced arcuately in such fashion that the pitmans 161 respectively connected thereto are reciprocated in opposite directions at a given instant. When gate 159 is dropped in this alternative embodiment, motor 239 is not stopped, as shown by the electrical circuit in Figure 14, because tray 156 has sufficient capacity to hold enough oranges to permit the attendant to remove the filled box 157 and substitute an empty one before the tray fills. Thereupon the operator grasping handle 210 raises gate 159 until latch 203 reengages, permitting the accumulated oranges on tray 156 to run into the box and additional oranges to pass until the gate again drops upon reaching the predetermined automatic count.

Although I have illustrated and described but a preferred practice and embodiments of the invention, it will be recognized that changes in the procedure and structural details may be made without departing from the spirit of the invention or the scope of the appended claims.

I claim:

1. A machine for filling containers with a specified number of pieces of fruit or the like, comprising, a feeding channel leading to a container, means for supplying said pieces to said feeding chanel, means in said channel to assist in moving said pieces in file relation, a gravity-actuated member engaged by each piece, circuit means energized by the movement of a predetermined plurality of said pieces engaging said member in a feeding direction, means for partially advancing a counting wheel each time said circuit means are so energized, a closure gate for barring the delivery end of said feeding channel, a latch adapted to hold said closure gate in open position, and yieldable means for moving said closure gate into closed barrier position relative to said feeding channel upon the unlatching of said latch by completion of the movement of said counting wheel through a predetermined rotary angle, whereby said container is filled with a predetermined number of pieces of fruit or the like before said closure gate moves into its closed position.

2. A machine for filling containers with a specified number of pieces of fruit or the like, comprising, a feeding channel leading to a container, a moving belt along said channel moving in the direction of feeding, a yieldable flap in said channel to reduce the momentum of said pieces, a trip adjacent said flap adapted to be successively engaged by said pieces, a ratchet mechanism successively energized by said trip when so engaged, a table tray over which said pieces pass after engaging said trip, and a closure gate to bar the delivery end of said table tray adapted to be moved into closed position after a specified number of said pieces have engaged said trip.

3. A machine for filling containers with a specified number of pieces of fruit or the like, comprising, a feeding channel leading to a container, means for supplying said pieces to said feeding channel, means in said channel for positively moving said pieces therealong, a resistance member to reduce the momentum of said pieces passing through said channel, a pivotally connected trip against which said pieces respectively fall, a ratchet mechanism successively actuated by the movement of said trip, a second ratchet mechanism periodically actuated by said first-named ratchet mechanism, a table tray over which said pieces pass after engaging said trip, and a closure gate for said table tray periodically actuated by said second ratchet mechanism to bar the delivery end of said table tray and stop the machine after a predetermined number of pieces have engaged said trip.

4. A machine for filling containers with a specified number of pieces of fruit or the like, comprising, a feeding channel leading to a container, a moving belt along said channel moving in the direction of feeding, a yieldable member in said channel to reduce the momentum of said pieces, a trip adjacent said yieldable member adapted to be successively engaged by said pieces, a ratchet mechanism successively energized by said trip when so engaged, a table tray over which said pieces pass after engaging said trip, and a closure gate for the delivery end of said feeding channel adapted to be automatically moved to bar said delivery end and to stop said machine after a specified number of said pieces have engaged said trip, and means for restarting said machine when said closure gate is opened.

5. A machine for filling containers with a specified number of pieces of fruit or the like, comprising, a feeding channel leading to a container, means for supplying said pieces to said feeding channel, means in said channel for moving said pieces therealong, a gravity trip mechanism against which said pieces respectively fall to actuate it, a ratchet mechanism successively actuated by the movement of said trip, a table tray over which said pieces pass after engaging said trip mechanism, a closure gate to bar the delivery end of said table tray when periodically actuated by said ratchet mechanism after a predetermined number of pieces have engaged said trip mechanism and run into said container, a settling platform adapted to make said container oscillate relative thereto in a generally level manner during the filling thereof by said pieces and means for stopping said second-mentioned means and settling platform when said closure gate closes.

6. A machine for filling containers with a specified number of pieces of fruit or the like, comprising, a storage container having an opening through which said pieces pass in single file, a rotatably mounted gate adapted when closed to block egress from said container, a chute, a belt in the bottom of said chute moving in the direction of feeding, a feeding platform, opposed walls on said platform moving to continue the feeding of said pieces, an overhanging flap in position to be successively engaged by said pieces to decrease their momentum, a trip adjacent the delivery end of said platform, a rotatable ratchet pawl connected to said trip, a ratchet gear actuated by said trip each time it is moved by one of said pieces, an ear on said gear adapted to energize a circuit once during each revolution of said gear, a second pawl operably connected to said circuit, a second ratchet gear adapted to be actuated by said second pawl each time said circuit is energized, an ear on said second gear adapted to energize a second circuit once during each revolution of said second gear, a run-down tray for said pieces adjacent said trip, a closure gate for the delivery end of said tray, and a latch operably connected to said second circuit to release said closure gate when said second circuit is energized, whereby a container is filled with a number of predetermined said pieces corresponding to the multiplication product of the number of teeth respectively on said ratchet gears before said closure gate automatically closes.

7. A machine for filling containers with a specified number of pieces of fruit or the like, comprising, a storage container having an opening through which said pieces pass in single file, a rotatably mounted gate adapted when closed to block egress from said container, a chute, a belt in the bottom of said chute moving in the direction of feeding, a feeding platform, opposed moving walls on said platform to continue the feeding of said pieces, an overhanging flap in position to be successively engaged by said pieces to decrease their momentum, a trip adjacent the delivery end of said platform, a rotatable ratchet pawl connected to said trip, a ratchet gear actuated by said trip each time it is moved by one of said pieces, an ear on said gear adapted to energize a circuit once during each revolution of said gear, a second pawl operably connected to said circuit, a second ratchet gear adapted to be actuated by said second pawl each time said circuit is energized, an ear on said second gear adapted to energize a second circuit once during each revolution of said second gear, a run-down tray for said pieces adjacent said trip, a closure gate for the delivery end of said tray, a latch operably connected to said second circuit to release said closure gate when said second circuit is energized, a drive motor for said machine, and a switch in the circuit of said motor held in closed position when said closure gate is held open by said latch, whereby a container is filled with a number of predetermined said pieces corresponding to the multiplication product of the number of teeth respectively on said ratchet gears before said closure gate automatically closes.

8. A machine for filling containers with a specified number of pieces of fruit or the like, comprising, a storage container having an opening through which said pieces pass in single file, a rotatably mounted gate adapted when closed to block egress from said container, a chute, a diverting gate adapted to pass said pieces through one side of said chute, a belt in the bottom of said chute moving in the direction of feeding, a feeding platform, opposed walls on said platform moving to continue the feeding of said pieces, an overhanging flap in position to be successively engaged by said pieces to decrease their momentum, a trip adjacent the delivery end of said platform, a rotatable ratchet pawl connected to said trip, a ratchet gear actuated by said trip each time it is moved by one of said pieces, an ear on said gear adapted to energize a circuit once during each revolution of said gear, a second pawl operably connected to said circuit, a second ratchet gear adapted to be actuated by said second pawl each time said circuit is energized, an ear on said second gear adapted to energize a second circuit once during each revolution of said second gear, a run-down tray for said pieces adjacent said trip, a closure gate for the delivery end of said tray, and a latch operably connected to said second circuit to release said closure gate when said second circuit is energized, whereby a container is filled with a number of predetermined said pieces corresponding to the multiplication product of the number of teeth respectively on said ratchet gears before said closure gate automatically closes.

9. A machine for filling containers with a specified number of pieces of fruit or the like, comprising, a feeding passage leading to a container, means for supplying such pieces to the entry end of said feeding passage, means for moving said pieces along said passage, gravity trip means adapted to be respectively engaged and moved by said pieces, a ratchet mechanism connected to said lever means and adapted to advance one step for each piece of fruit engaging said lever means, a closure gate to bar the delivery end of said feeding channel and adapted to close upon the engagement of said specified number of said pieces with said lever means, an oscillating platform adjacent the delivery end of said feeding channel to vertically support said container during the filling thereof, abutments adjacent the ends of said platform, and means to oscillate said platform in a horizontal plane to move said container relative to said platform and jar it by impact against said abutments during said filling.

10. A machine for filling containers with a specified number of pieces of fruit or the like, comprising, a feeding passage leading to a container, means for supplying such pieces to the entry end of said feeding passage, means for moving said pieces along said passage, lever means adapted to be respectively engaged and moved by said pieces, a ratchet mechanism connected to said lever means and adapted to advance one step for each piece of fruit engaging said lever means, a closure gate for the delivery end of said feeding channel adapted to close upon the engagement of said specified number of said pieces with said lever means, an oscillating platform adjacent the delivery end of said feeding channel to support said container during the filling thereof, abutments adjacent the ends of said platform, means to oscillate said platform in a horizontal plane to cause said container to be jarred by impact against said abutments during said filling, a readiness platform for an empty container adjacent one side of said oscillating platform, said readiness platform being somewhat lower than said oscillating platform to prevent said empty container from sliding on to said oscillating platform, and a treadle to elevate said readiness platform substantially to the level of said oscillating platform.

11. A machine for filling containers with a specified number of pieces of fruit or the like, comprising, an inclined feeding passage leading to a container, means for supplying such pieces of fruit or the like to the upper end of said channel, means along said channel to assist in moving said pieces in the direction of feeding, means in said channel to reduce the momentum of said pieces passing therethrough, gravity trip means engaged by each piece, a counting circuit adapted to be energized by the engagement of a predetermined plurality of said pieces with said last-mentioned means, at least one counting wheel in said counting circuit adapted to be rotated through a prescribed arc each time said trip means are actuated, a table tray over which said pieces pass after engaging said trip means, and a closure gate to close the delivery end of said table tray after said specified number of said pieces engage said trip means, said closure gate being actuated by the prescribed movement of said counting wheel through a predetermined number of said prescribed arcs.

12. A machine for filling containers with a specified number of pieces of citrus fruit or the like, comprising, an inclined feeding table, a series of compartments abreast the lower end of said table, a gate swingably mounted adjacent said compartments to close the lower ends thereof, a series of ejector plates in the lower ends of said respective compartments, a switch lever projecting into the lower end of said respective compartments and adapted to be moved when a piece of fruit or the like rests against said gate, a barrier hinged adjacent said compartments and adapted to project into each immediately before said gate is opened, said barrier being positioned so as not to engage said pieces resting against said gate, a cam shaft adapted to actuate said barrier and gate and plates in sequence, a clutch for said cam shaft, and a circuit connecting said levers in series, whereby when all of said levers are moved by a row of said pieces resting against said gate, said circuit is closed, causing said clutch to permit said cam shaft to rotate through a single revolution to, in sequence, lower said barrier, open said gate, move said ejector plates in ejecting action, close said gate and raise said barrier, thereby discharging said row of said pieces.

13. A machine for filling containers with a specified number of pieces of citrus fruit or the like, comprising, an inclined feeding table, a series of compartments in a row abreast at the lower end of said table, a gate adapted to close the lower ends of said compartments, a series of ejector plates substantially flush with said table at the lower end of the respective compartments, a switch lever projecting into the lower end of each compartment and adapted to be moved by a piece of fruit or the like resting against said gate, a circuit connecting said levers and adapted to be energized when all said levers are so moved, a barrier of fingers adjacent said compartments and adapted to be projected thereinto immediately before said gate is opened to prevent such pieces not at the lower ends of said compartments from moving into said lower ends, said circuit upon being energized being arranged to actuate said fingers, said gate and said ejector plates in sequence, a run-down tray for the successive rows of pieces released by the successive openings of said gate, and a closure gate for said run-down tray so constructed and arranged as to move into closed position when said specified number of pieces is released by said first-named gate.

14. A machine for filling containers with a specified number of pieces of citrus fruit or the like, comprising, an inclined feeding table, a series of compartments in a row abreast at the lower end of said table, a gate adapted to close the lower ends of said compartments, a series of ejector plates substantially flush with said table at the lower end of the respective compartments, a switch lever projecting into the lower end of each compartment and adapted to be moved by a piece of fruit or the like resting against said gate, a circuit connecting said levers and adapted to be energized when all said levers are so moved, a barrier of fingers adjacent said compartments and adapted to be projected thereinto immediately before said gate is opened to prevent such pieces not at the lower ends of said compartments from moving into said lower ends, a clutch actuated when said circuit is energized, a cam shaft controlled by said clutch and adapted to make a single revolution each time said circuit is energized to respectively lower said barrier, open said gate, raise said ejector plates and close said gate and raise said barrier, a run-down tray for the successive rows of pieces released by the successive openings of said gate, a closure gate for said run-down tray, and a latch to hold said closure gate in open position until said specified number of pieces is discharged through said first-named gate.

15. A machine for filling containers with a specified number of pieces of citrus fruit or the like, comprising, a feeding table, a series of compartments side by side at the lower end of said table, a gate swingably mounted adjacent said compartments to close the lower ends thereof, a series of ejector plates in the lower ends of said respective compartments, a switch lever projecting into the lower end of said respective compartments and adapted to be moved when a piece of fruit or the like rests against said lever, a barrier hinged adjacent said compartments and adapted to project into each immediately before said gate is opened, said barrier being positioned so as not to engage said pieces resting against said gate when said barrier is so projected, a cam shaft adapted to actuate said barrier, gate and plates in sequence, a clutch for said cam shaft, a circuit connecting said levers in series and adapted to be energized when all of said levers are so moved, a counting wheel adapted to be moved through a prescribed arc when said circuit is energized, a run-down apron leading from said compartments to a container, a closure gate at the delivery end of said apron, a latch adapted to hold said closure gate in open position and to be actuated periodically by the revolution of said counting wheel, whereby upon completion of successive discharges of said pieces from said compartments aggregating said specified number, said latch is actuated by said counting wheel to close the delivery end of said run-down apron until said filled container can be replaced by an empty container.

16. A machine for filling containers with a specified number of pieces of citrus fruit or the like, comprising, a feeding table, a series of compartments side by side at the lower end of said table, a gate swingably mounted adjacent said compartments to close the lower ends thereof, a series of ejector plates in the lower ends of said respective compartments, a switch lever projecting into the lower end of said respective compartments and adapted to be moved when a piece of fruit or the like rests against said lever, a barrier hinged adjacent said compartments and adapted to project into each immediately before said gate is opened, said barrier being positioned so as not to engage said pieces resting against said gate when said barrier is so projected, a cam shaft adapted to actuate said barrier, gate and plates in sequence, a clutch for said cam shaft, a circuit connecting said levers in series and adapted to be energized when all of said levers are so moved, a counting wheel adapted to be moved through a prescribed arc when said circuit is energized, a run-down apron leading from said compartments to a container, a closure gate at the delivery end of said apron, and a latch adapted to hold said closure gate in open position and to be actuated periodically and momentarily by the revolution of said counting wheel, whereby upon completion of successive discharges of said pieces from said compartments aggregating said specified number, said latch is actuated by said counting wheel to close the delivery end of said run-down apron by dropping and unlatching said closure gate until said closure gate is manually relatched after said filled container is replaced by an empty container.

17. A machine for filling containers with a specified number of pieces of citrus fruit or the like, comprising, a feeding table, a series of compartments in a row abreast at the lower end of said table, agitating means adjacent the entrance to said compartments to assist the movement of said pieces into said compartments, a gate adapted to close the lower ends of said compartments, a series of ejector plates substantially flush with said table at the lower end of the respective compartments, a switch lever projecting into the lower end of each compartment and adapted to be moved by a piece of fruit or the like resting thereagainst, a circuit connecting said levers and adapted to be energized when all said levers are so moved, a barrier adjacent said compartments and adapted to be projected thereinto immediately before said gate is opened to prevent such pieces not at the lower ends of said compartments from moving into said lower ends, a clutch actuated when said circuit is energized, a cam shaft controlled by said clutch and adapted each time said circuit is energized to respectively lower said barrier, open said gate, raise said ejector plates, close said gate and raise said barrier, a run-down tray leading to a container for the successive rows of pieces released by the successive openings of said gate, a closure gate for said run-down tray, and a latch to hold said closure gate in open position until said specified number of pieces is discharged through said first-named gate.

18. A machine for filling containers with a specified number of pieces of citrus fruit or the like, comprising, an inclined feeding table, a series of compartments in a row abreast at the lower end of said table, a gate adapted to close the lower ends of said compartments, a series of ejector plate substantially flush with said table at the lower end of the respective compartments, a switch lever projecting into the lower end of each compartment and adapted to be moved by a piece of fruit or the like resting against said gate, a circuit connecting said levers and adapted to be energized when all said levers are so moved, a barrier of fingers adjacent said compartments and adapted to be projected thereinto immediately before said gate is opened to prevent such pieces not at the lower ends of said compartments from moving into said lower ends, said circuit upon being energized being arranged to actuate said fingers, said gate and said ejector plates in sequence, a run-down tray leading to a container for the successive rows of pieces released by the successive openings of said gate, a closure gate for said run-down tray so constructed and arranged as to move into closed position when said specified number of pieces is released by said first-named gate, and a settling platform adapted to make said container oscillate during the filling thereof by said pieces.

19. In a machine for filling containers with a specified number of pieces of fruit or the like, an actuating mechanism, comprising, a shaft, a freely rotating pulley on said shaft, an integral hub on said pulley, a cam recess in said hub, a splineway in said shaft, a spline in said splineway, a recess along the top edge of said spline, resilient means urging said spline toward said cam recess, a clutch having a tapered portion adapted to engage said recess in said spline, a solenoid adapted when energized to move said clutch away from engagement position with said recess in said spline, and a friction brake for said shaft, whereby when said solenoid is energized pulling said clutch out of engagement with said recess in said spline, said spline engages said cam recess to rotate said shaft through a prescribed rotary angle until the deenergizing of said solenoid causes the narrowest portion of said tapered portion of said clutch to reenter said recess in said spline, withdrawing it from said cam recess and stopping said shaft.

20. A machine for filling containers with a specified number of pieces of fruit or the like, comprising, a feeding channel leading to a container, a plurality of feeding and counting compartments spaced side-by-side across said channel, means for arresting said pieces associated with said compartments, switch means connected in series and positioned in said compartments, said switch means being respectively adapted to be moved by said pieces in said compartment, a circuit adapted to be energized when all of said switch means are so moved to release said pieces so moving said switch means, a counting wheel also adapted to be actuated each time said circuit is energized, and a closure gate adapted to be actuated after said counting wheel has itself been actuated a predetermined number of times.

References Cited in the file of this patent

UNITED STATES PATENTS

| | | |
|---|---|---|
| 1,090,855 | Jagenberg | Mar. 24, 1914 |
| 1,900,907 | Buxton | Mar. 14, 1933 |
| 2,047,272 | Kimball et al. | July 14, 1936 |
| 2,059,398 | Roemer | Nov. 3, 1936 |
| 2,144,708 | Rau | Jan. 24, 1939 |
| 2,204,126 | Domke | June 11, 1940 |
| 2,304,982 | Wilckens | Dec. 15, 1942 |
| 2,487,265 | Nelson | Nov. 8, 1949 |
| 2,536,516 | Peterson | Jan. 2, 1951 |